US 10,755,384 B2

(12) United States Patent
Akiyama et al.

(10) Patent No.: US 10,755,384 B2
(45) Date of Patent: Aug. 25, 2020

(54) OBJECT DETECTION METHOD AND OBJECT DETECTION SYSTEM

(71) Applicant: Clarion Co., Ltd., Saitama-shi, Saitama (JP)

(72) Inventors: Yasuhiro Akiyama, Tokyo (JP); Koichi Hamada, Tokyo (JP); Yoshitaka Uchida, Saitama (JP); Takehito Ogata, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 219 days.

(21) Appl. No.: 15/772,359

(22) PCT Filed: Nov. 2, 2016

(86) PCT No.: PCT/JP2016/082611
§ 371 (c)(1),
(2) Date: Apr. 30, 2018

(87) PCT Pub. No.: WO2017/078072
PCT Pub. Date: May 11, 2017

(65) Prior Publication Data
US 2018/0315167 A1 Nov. 1, 2018

(30) Foreign Application Priority Data

Nov. 6, 2015 (JP) .................................. 2015-218058

(51) Int. Cl.
*G06T 5/00* (2006.01)
*G06K 9/00* (2006.01)
(Continued)

(52) U.S. Cl.
CPC .......... *G06T 5/001* (2013.01); *G06K 9/00791* (2013.01); *G06K 9/03* (2013.01);
(Continued)

(58) Field of Classification Search
None
See application file for complete search history.

(56) References Cited

U.S. PATENT DOCUMENTS 9,454,703 B2 * 9/2016 Einecke ............... H04N 5/2171
10,311,335 B1 * 6/2019 Kim ..................... G06N 3/0454
(Continued)

FOREIGN PATENT DOCUMENTS

| JP | 2007-251690 A | 9/2007 |
|----|---------------|--------|
| JP | 2007-318355 A | 12/2007 |
| JP | 2013-191072 A | 9/2013 |

OTHER PUBLICATIONS

Japanese-language Office Action issued in counterpart Japanese Application No. 2015-218058 dated May 7, 2019 with unverified English translation (eight pages).

(Continued)

*Primary Examiner* — Kim Y Vu
*Assistant Examiner* — Molly Delaney
(74) *Attorney, Agent, or Firm* — Crowell & Moring LLP

(57) ABSTRACT

The objective of the present invention is to provide an object detection method such that an object such as a vehicle can be detected from an image captured by an on-board camera even when a lens of the on-board camera is dirty. In order to achieve the objective, in this object detection method for detecting an object included in a captured image, an original image including the object to be detected is prepared from the captured image, a processed image is generated from the prepared original image by applying predetermined processing to the original image, and learning regarding restoration of an image of the object to be detected is performed using the original image and the processed image.

13 Claims, 17 Drawing Sheets

(51) Int. Cl.
*H04N 5/232* (2006.01)
*G06K 9/03* (2006.01)
*H04N 7/18* (2006.01)
*G06T 7/00* (2017.01)

(52) U.S. Cl.
CPC .............. *G06T 5/00* (2013.01); *G06T 7/0002* (2013.01); *H04N 5/232* (2013.01); *H04N 7/18* (2013.01); *G06K 2209/23* (2013.01); *G06T 2207/10004* (2013.01); *G06T 2207/20004* (2013.01); *G06T 2207/20081* (2013.01); *G06T 2207/30168* (2013.01); *G06T 2207/30252* (2013.01)

(56) References Cited

U.S. PATENT DOCUMENTS

| | | | |
|---|---|---|---|
| 10,339,812 B2* | 7/2019 | Tamer | H04N 5/247 |
| 10,467,503 B1* | 11/2019 | Kim | G06K 9/6255 |
| 2014/0232869 A1* | 8/2014 | May | H04N 7/18 |
| | | | 348/148 |
| 2015/0015384 A1 | 1/2015 | Shima et al. | |
| 2015/0175161 A1* | 6/2015 | Breed | B60W 30/09 |
| | | | 348/148 |
| 2015/0178591 A1* | 6/2015 | Fergus | G06T 5/005 |
| | | | 382/157 |

OTHER PUBLICATIONS

Extended European Search Report issued in counterpart European Application No. 16862132.4 dated Apr. 12, 2019 (12 pages).

Eigen et al., "Restoring an Image Taken Through a Window Covered with Dirt or Rain", IEEE International Conference on Computer Vision, Dec. 2013, pp. 633-640, XP 055450390, eight pages.

International Search Report (PCT/ISA/210) issued in PCT Application No. PCT/JP2016/082611 dated Jan. 17, 2017 with English translation (two pages).

Japanese-language Written Opinion (PCT/ISA/237) issued in PCT Application No. PCT/JP2016/082611 dated Jan. 17, 2017 (four pages).

International Preliminary Report on Patentability (PCT/IPEA/409 and PCT/IPEA/416) issued in PCT Application No. PCT/JP2016/082611 dated Sep. 12, 2017 (five pages).

Teramoto et al., "Stacked Denoising Autoencoder no Hanka Seino Kojyo ni Kansuru Ichi Kento", IPSJ SIG Technical Report, Jan. 15, 2015, pp. 297-302 (eight pages total), vol. 114, No. 410.

* cited by examiner

F I G. 1
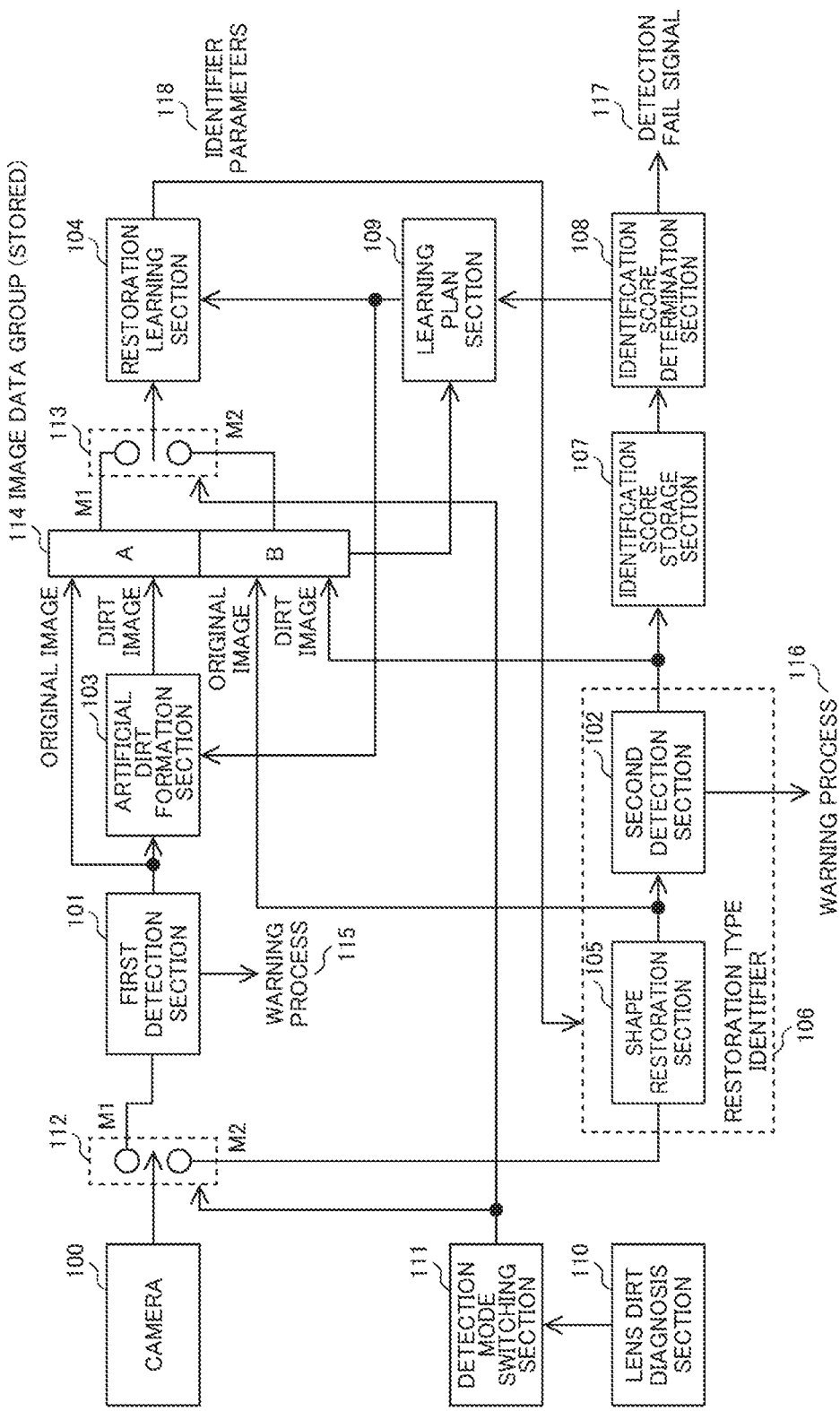

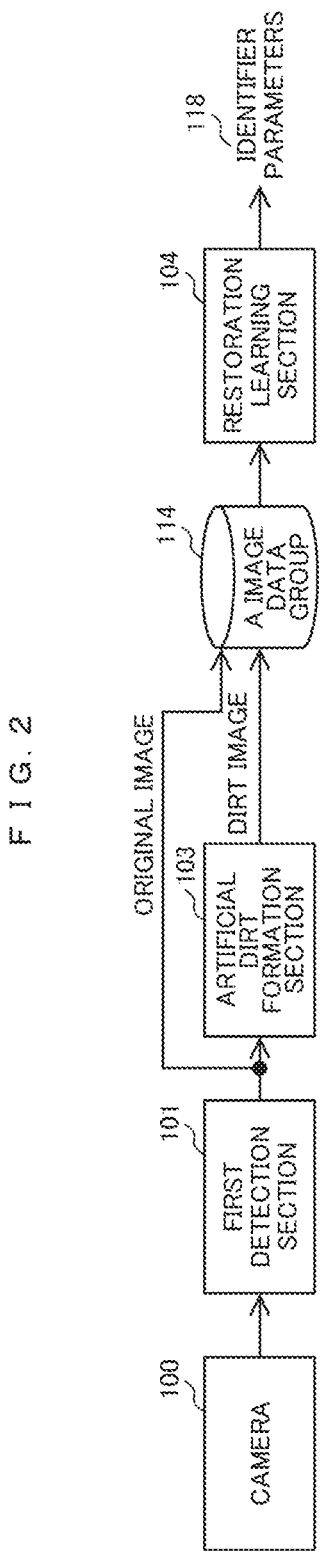

ORIGINAL IMAGE

ARTIFICIAL DIRT IMAGE 1

ARTIFICIAL DIRT IMAGE 2

MUD

RAINDROPS

CLOUD

ICE

F I G. 5 A

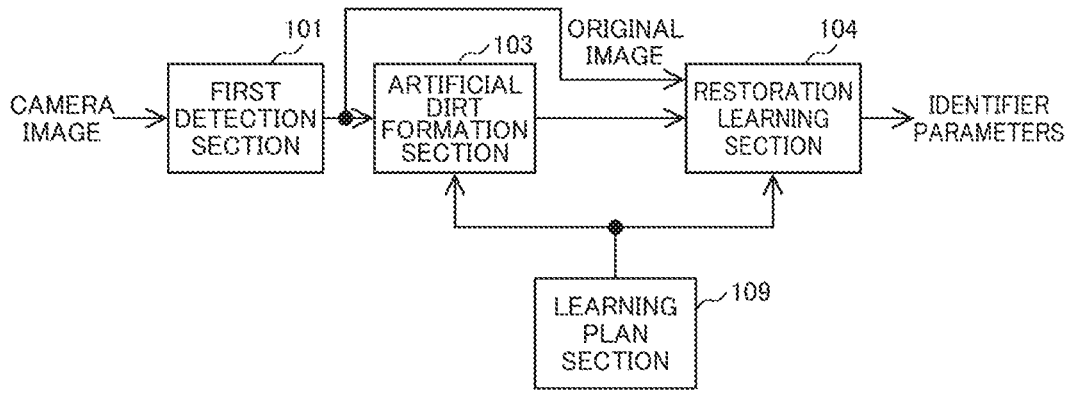

F I G. 5 B

Learning Target Setting Table (500)

| TARGET SETTING | VALUE |
|---|---|
| POSITIVE LEARNING COUNT | mpn |
| NEGATIVE LEARNING COUNT | mnn |
| LEARNING COUNT OF DETECTED VEHICLE MODEL 1 | mc1 |
| ... | |
| LEARNING COUNT OF DETECTED VEHICLE MODEL n | mcn |
| LEARNING COUNT OF DIRT PATTERN 1 | md1 |
| ... | |
| LEARNING COUNT OF DIRT PATTERN m | mdn |

F I G. 5 C

Negative Learning Count (501)

| POSITIVE LEARNING COUNT | lpn |
|---|---|
| LEARNING HISTORY TABLE | lnn |
| LEARNING COUNT OF DETECTED VEHICLE MODEL 1 | lmc1 |
| ... | |
| LEARNING COUNT OF DETECTED VEHICLE MODEL n | lmcn |
| LEARNING COUNT OF DIRT PATTERN 1 | lmd1 |
| ... | |
| LEARNING COUNT OF DIRT PATTERN m | lmdn |

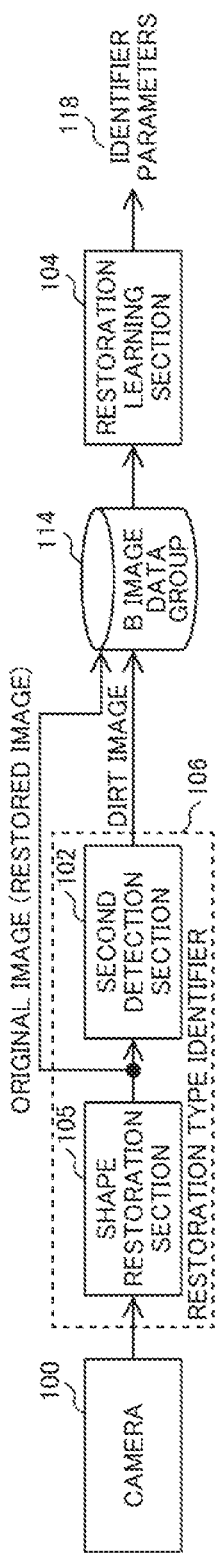
F I G. 6 A
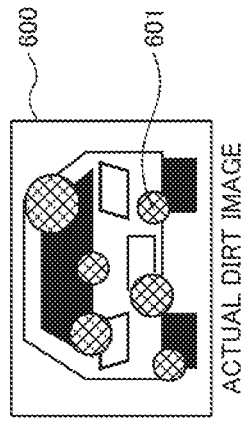
F I G. 6 B
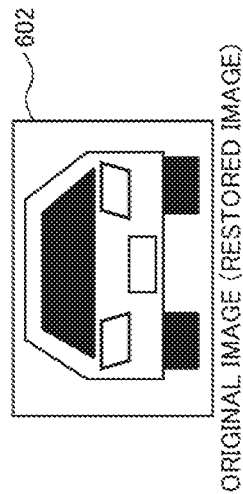
F I G. 6 C

F I G. 7 C

| LATEST IDENTIFICATION RESULTS | VALUE |
|---|---|
| DETECTED VEHICLE MODEL TYPE | ccls |
| IDENTIFICATION EVALUATION VALUE OF DETECTED VEHICLE MODEL | cc |
| DIRT PATTERN TYPE | dcls |
| IDENTIFICATION EVALUATION VALUE OF DIRT PATTERN | dc |
| EVALUATION THRESHOLD VALUES | |
| THRESHOLD VALUE OF DETECTED VEHICLE MODEL mc | th1 |
| THRESHOLD VALUE OF DIRT PATTERN md | th2 |
| THRESHOLD VALUE OF ALL VEHICLES | th3 |
| THRESHOLD VALUE OF ALL DIRT PATTERNS | th4 |
| THRESHOLD VALUE OF VEHICLE DETECTION MODE SWITCHING | th5 |

LATEST IDENTIFICATION INFORMATION TABLE

F I G. 7 D

| CUMULATIVE VALUES OF IDENTIFICATION RESULTS | VALUE |
|---|---|
| AVERAGE IDENTIFICATION EVALUATION VALUE OF ALL DETECTED VEHICLE MODELS | cave |
| AVERAGE IDENTIFICATION EVALUATION VALUE OF ALL DIRT PATTERNS | dave |
| AVERAGE IDENTIFICATION EVALUATION VALUE OF DETECTED VEHICLE MODEL 1 | avc1 |
| ... | |
| AVERAGE IDENTIFICATION EVALUATION VALUE OF DETECTED VEHICLE MODEL n | avcn |
| AVERAGE IDENTIFICATION EVALUATION VALUE OF DIRT PATTERN 1 | avd1 |
| ... | |
| AVERAGE IDENTIFICATION EVALUATION VALUE OF DIRT PATTERN m | avd2 |

ACCUMULATED IDENTIFICATION INFORMATION TABLE

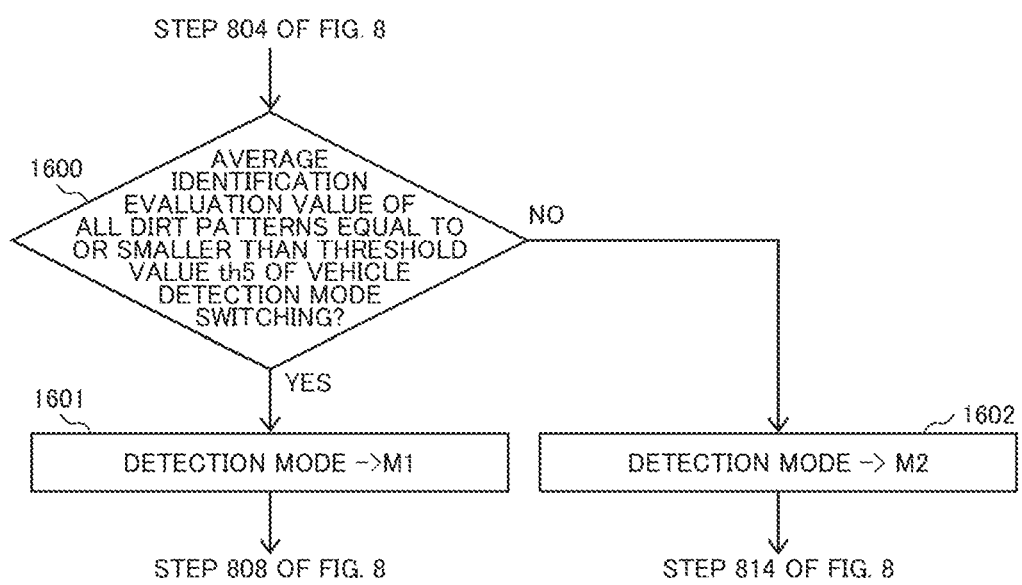
F I G. 16

OBJECT DETECTION METHOD AND OBJECT DETECTION SYSTEM

TECHNICAL FIELD

The present invention relates to an object detection method and an object detection system that are used in an image processing system for detecting an object by using a camera image.

BACKGROUND ART

An advanced technology is available for preventing an accident, such as a vehicle-to-vehicle collision or a vehicle-to-person collision, by monitoring the surroundings of a vehicle with an on-board camera, outputting a warning to a driver of the vehicle upon detection of a dangerous condition, and automatically controlling the behavior of the vehicle as needed. In a system where an on-board camera is mounted on the outer surface of a vehicle, a lens of the on-board camera is likely to be dirtied by mud and dust that are whirled up due to rainy or other bad weather or traveling of the vehicle. A dirty lens may result in a false warning and become detrimental to safety. To avoid such a situation, a system for automatically detecting a dirty lens and removing dirt from the lens by spraying air or water onto it is put to practical use. However, such a system is generally expensive. It is preferred that vehicle detection be steadily achieved wherever possible even if the shape of the vehicle imaged with a considerably dirty lens is partially lost or blurred.

A technology disclosed, for example, in Patent Literature 1 compares mutually corresponding pixels in a plurality of images that are captured at different time points to show lens dirt of an on-board camera, determines that pixels having an inter-image density difference equal to or smaller than a threshold value are dirty, and notifies a user of a dirtied lens.

CITATION LIST

Patent Literature

PTL 1: Japanese Patent Application Laid-Open No. 2007-318355

SUMMARY OF INVENTION

Technical Problem

Patent Literature 1 discloses a technology that detects a dirty lens of an on-board camera and notifies a user of the dirty lens. However, Patent Literature 1 does not describe a method of performing a vehicle detection process by using images captured with a dirty lens. Therefore, although Patent Literature 1 makes it possible to identify a region where lens dirt exists, it does not disclose a technology for recognizing a vehicle while the shape of the vehicle is partly lost or distorted by lens dirt. As a result, Patent Literature 1 does not make it easy to perform the vehicle detection process while lens dirt exists.

An object of the present invention is to achieve vehicle detection even when a lens of an on-board camera is dirty.

Solution to Problem

In accomplishing the above object, according to an aspect of the present invention, there is provided an object detection method for detecting an object in a captured image. The object detection method includes: preparing an original image including a detection target object from the captured image; generating a processed image by performing a predetermined process on the prepared original image by using the prepared original image; and conducting restoration learning about an image of the detection target object by using the original image and the processed image.

Advantageous Effects of Invention

Even when a lens of an on-board camera is dirty, the present invention makes it possible to detect a vehicle from an image captured by the on-board camera.

BRIEF DESCRIPTION OF DRAWINGS

FIG. 1 is a diagram illustrating a configuration of a vehicle detection system according to an embodiment of the present invention.

FIG. 2 is a diagram illustrating an example of restoration learning in a clear mode.

FIGS. 5A to 5C are diagrams illustrating exemplary operations of a learning plan section.

FIGS. 6A to 6C are diagrams illustrating examples of restoration learning in a dirty mode.

FIGS. 7A to 7D are diagrams illustrating information stored in an identification score storage section and exemplary operations of an identification score determination section.

FIG. 16 is a flowchart illustrating an alternative example of control over vehicle detection mode switching.

DESCRIPTION OF EMBODIMENTS

Figure 3A:
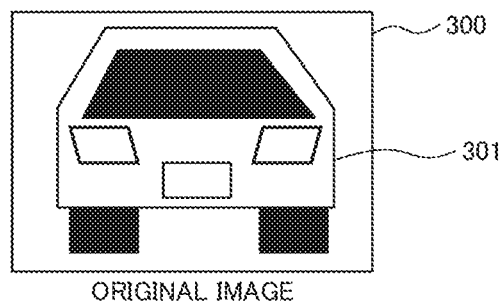
FIGS. 3A to 3C are diagrams illustrating images that are used for restoration learning in the clear mode.

An embodiment of the present invention will now be described in detail with reference to the accompanying drawings.

The following example relates to an outside recognition device that detects a vehicle with an on-board camera and issues a vehicle-to-vehicle collision warning to a driver of the vehicle or outputs a vehicle control signal acting as a trigger for applying an automatic brake to prevent a collision. In the present embodiment, however, a detection target object is not limited to a vehicle. The present embodiment may be implemented with the detection target changed to a different one. Further, the camera is not limited to an on-board camera. The present embodiment may be implemented with the camera changed, for example, to a street surveillance camera.

Example 1

FIG. 1 is a block diagram illustrating a configuration of the outside recognition device according to the present example.

The outside recognition device includes a first detection section 101, an artificial dirt formation section 103, a restoration learning section 104, a restoration type identifier 106, an identification score storage section 107, an identification score determination section 108, a learning plan section 109, a lens dirt diagnosis section 110, and a detection mode switching section 111. A camera 100 connected to the outside recognition device transmits a captured image to the outside recognition device.

The camera 100 is mounted on the body of a host vehicle to capture an image of the outside of the host vehicle. The first detection section 101 receives from the camera 100 an image captured when the camera lens of the camera 100 is not dirty, detects a vehicle other than the host vehicle (hereinafter simply referred to as a vehicle) from the received image, and prepares a vehicle image of the detected vehicle (original image). The artificial dirt formation section 103 generates an artificial dirt image from the vehicle image prepared by the first detection section 101. The artificial dirt image is a processed image that is obtained by performing image processing on an image showing a portion surrounding the detected vehicle in order to artificially superimpose dirt over the vehicle image.

Based on the vehicle image prepared by the first detection section 101 and the artificial dirt image (processed image) generated by the artificial dirt formation section 103, the restoration learning section 104 performs a machine learning process of restoring the state of the original vehicle image from the state of the artificial dirt image, that is, restoring a state close to an image state from which artificial dirt is removed. As a result of learning, the restoration learning section 104 generates identifier parameters 118, which serve as information required for the process of restoring the original vehicle image.

The restoration type identifier 106 includes a shape restoration section 105 and a second detection section 102. Based on an image captured by the camera 100 when the lens of the camera 100 is actually dirty, the shape restoration section 105 uses the identifier parameters 118 generated by the restoration learning section 104 to restore a vehicle shape from the image captured while the lens is dirty. The second detection section performs vehicle detection based on the image restored by the shape restoration section 105.

The identification score storage section 107 stores an evaluation value about identification that is calculated when the restoration type identifier 106 performs shape restoration. The identification score determination section 108 analyzes the evaluation value information stored in the identification score storage section 107 and estimates the update of restoration learning progress and the accuracy of vehicle recognition based on restoration learning. If the vehicle recognition accuracy is equal to or lower than a predetermined threshold value, the identification score determination section 108 outputs a FAIL signal in order to stop a vehicle detection process. Based on the result of determination by the identification score determination section 108, the learning plan section 109 changes an artificial dirt formation pattern and exercises ON/OFF control over a vehicle model type subjected to restoration learning.

The lens dirt diagnosis section 110 checks for dirt on the lens of the camera 100, for example, by analyzing an image captured by the camera 100, and determines whether or not the lens is dirty. Based on the result of lens dirt determination by the lens dirt diagnosis section 110, the detection mode switching section 111 switches a vehicle detection mode between a clear mode and a dirty mode. The clear mode is a vehicle detection mode for a situation where the lens is not dirty. The dirty mode is a vehicle detection mode for a situation where the lens is dirty.

Further, the first detection section 101 and the second detection section 102 are capable of observing, for example, the distance between the detected vehicle and the host vehicle and the speed at which the detected vehicle is approaching the host vehicle, and outputting analysis information. The analysis information may be used to analyze whether a collision may occur between the detected vehicle and the host vehicle, and perform a warning process of issuing a warning.

FIG. 2 illustrates an example of restoration learning in the clear mode.

Restoration learning in the clear mode is performed by allowing the first detection section 101 to perform vehicle detection based on an image captured by the camera 100 while the camera lens of the camera 100 is not dirty, and prepare an image (original image) that is obtained by cutting the image of a portion surrounding the detected vehicle from the image captured by the camera 100, allowing the artificial dirt formation section 103 to generate an artificial dirt image by performing image processing to artificially (in a pseudo manner) superimpose dirt over the original image, and temporarily storing a pair of the original image and the artificial dirt image as a group of A image data 114. When the A image data group 114 formed of a predetermined number of such pairs is stored, it is inputted to the restoration learning section 104.

The restoration learning section 104 performs the machine learning process of restoring the state of the detected original vehicle image from the state of the artificial dirt image, that is, restoring a state close to an image state from which artificial dirt is removed. As a result of learning, the restoration learning section 104 generates the identifier parameters 118, which serve as information required for the process of restoring the original vehicle image.

The size of the A image data group that causes the restoration learning section 104 to conduct learning may be set as appropriate. For example, restoration learning may be conducted each time the number of stored A image data is increased by 10,000.

When the outside recognition device is started up for the first time, no restoration learning is performed. Therefore, at a manufacturing stage of the outside recognition device, existing identifier parameters 118 generated offline are preset in the restoration type identifier. An alternative is to refrain from allowing the restoration type identifier 106 to perform vehicle detection at an early stage of outside recognition device operation, and permit the restoration type identifier 106 to perform vehicle detection when the identifier parameters 118 are updated due to the progress of learning by the restoration learning section 104.

Restoration learning is a machine learning method of inputting a plurality of pairs of an image including a noise component in a detection target and an image including no noise component, and automatically setting identifier parameters in such a manner that an image without a noise component can be restored from a noisy image. One example of such machine learning is deep learning. Deep learning makes it possible to automatically extract detailed image feature parameters common to a plurality of inputted images.

One example of a feature parameter extraction method is a method of extracting features by using a neutral network structure. The neutral network structure is obtained by first combining a large number of input/output functions (activation functions) called neuron units, which react only when they coincide with image features common to an input image group on an individual small image region basis (return information indicative of whether image features extracted from input images coincide with comparative image features tentatively defined as identifiers). The neuron units are then stacked in the form of plural layers to form a pyramid structure, and the identifier parameters are extracted on an individual layer basis so that the detection target can be gradually identified while the image position and size of the detection target are varied. Eventually, the identifier parameters capable of identifying all detection targets are obtained. Further, in restoration learning, the identifier parameters include internal operation information for automatically restoring an image without a noise component from a noisy image.

Figure 3B:
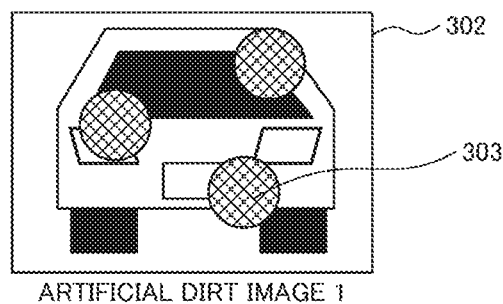
Figure 3C:
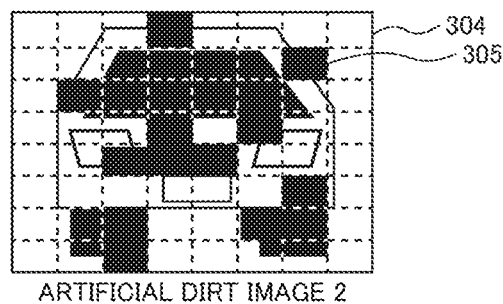

FIGS. 3A to 3C illustrate images used for restoration learning in the clear mode.

FIG. 3A is a vehicle image 300 of a vehicle 301 that is detected by the first detection section 101 from an image obtained under conditions where the lens is not dirty.

FIG. 3B is an artificial dirt image 302 that is obtained by superimposing artificial dirt 303 over the image shown in FIG. 3A. FIG. 3B shows an example that artificially reproduces an image captured while, for example, mud and raindrops are attached to the lens.

FIG. 3C is a differently formed artificial dirt image. It is an artificial dirt image 304 obtained by dividing the original vehicle image 300 into predetermined small regions and randomly disposing image regions 305 hidden by the dirt on the lens. The area and size of the regions hidden by the dirt may be standardized for each image or varied as appropriate for each image. This method makes it easy to generate an artificial dirt image.

Referring to FIGS. 3B and 3C, the image of artificial dirt may be processed, for example, by painting it black to hide an affected vehicle body portion on the presumption that mud is attached to the lens. An alternative is, for example, to permeabilize the affected vehicle body portion until it is dimly visible on the presumption that raindrops are attached to the lens or process the affected vehicle body portion until its shape is distorted on the presumption that ice or raindrops are attached to the lens.

In the clear mode, a plurality of pairs of the vehicle image including no lens dirt 300 and the artificial dirt image 302 or the differently formed artificial dirt image 304 are inputted to the restoration learning section 104.

FIGS. 4A to 4D illustrate examples of image processing methods used in the artificial dirt formation section 103.

Figure 4A:
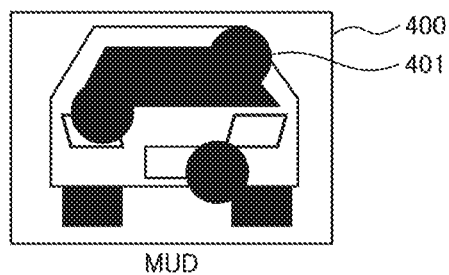
FIGS. 4A to 4D are diagrams illustrating examples of image processing methods used in an artificial dirt formation section.

FIG. 4A shows an artificial dirt image of mud 400 that is obtained, for example, by performing processing so as to hide a vehicle body portion by painting it black on the presumption that mud 401 is attached to the lens.

Figure 4B:
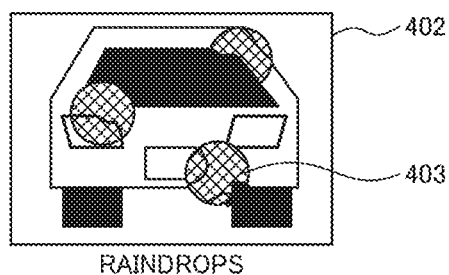

FIG. 4B shows an artificial dirt image of raindrops 402 that is obtained, for example, by performing a permeabilization process until an affected vehicle body portion is dimly visible on the presumption that raindrops 403 are attached to the lens. As regards a portion affected by artificial raindrops, an image of the inside of artificial raindrops may be processed until it is distorted as needed to reproduce a light refraction phenomenon caused by raindrops.

Figure 4C:
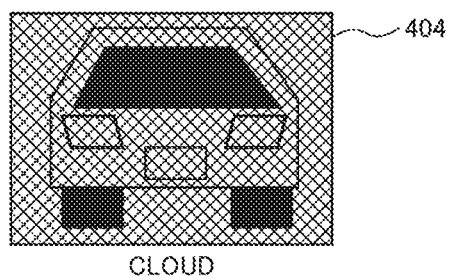

FIG. 4C shows an artificial dirt image 404 of cloud that is obtained by performing processing so as to decrease the contrast of a vehicle body on the presumption that, for example, muddy water is splashed all over the lens surface due to vehicle movement under rainy weather conditions and dried over time until it becomes cloudy.

Figure 4D:
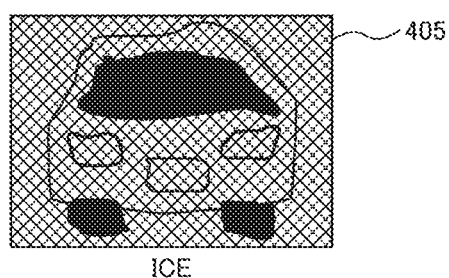

FIG. 4D shows an artificial dirt image of ice 405 that is obtained by performing processing so as to decrease the contrast of the vehicle body and distort its shape on the presumption that water attached to the lens surface is frozen due to vehicle movement under cold weather conditions.

FIGS. 5A to 5C illustrate examples of operations of the learning plan section.

FIGS. 5A, 5B, and 5C illustrate information that is conveyed from the learning plan section 109 to the artificial dirt formation section 103 and the restoration learning section 104.

The learning plan section 109 stores a learning target setting table 500 (FIG. 5B) and a learning history table 501 (FIG. 5C). The learning target setting table 500 presets a target that is to be attained when the restoration learning section 104 progressively learns. The learning history table 501 records learning activities conducted thus far and retains the resulting record.

Learning target values preset in the learning target setting table 500 include a positive learning count of input images, a negative learning count of input images, a learning count of each detected vehicle model, and a learning count of each dirt pattern. A positive image is an image whose subject is a vehicle to be detected. A negative image is an image whose subject is other than a vehicle. The learning counts of detected vehicle models are set based on the number of vehicle models identifiable by the restoration type identifier 106. The learning counts of dirt patterns are set based on the number of types of dirt on which the restoration type identifier 106 can perform a restoration process.

The learning history table 501 includes the positive learning count of learned input images, the negative learning count of learned input images, the learning count of each learned detected vehicle model, and the learning count of each learned dirt pattern.

Based on the number of inputs of the types of inputted positive and negative images, the number of inputs of detected vehicle models, the number of inputs of dirt patterns, the restoration learning section 104 updates the associated learning counts in the learning history table 501 and repeatedly conducts restoration learning until all the target values set in the learning target setting table 500 are cleared.

The learning target setting table 500 may be allowed to semipermanently conduct restoration learning without setting specific values. If, for example, a minus value is set as a learning target setting, the restoration learning of the associated item may be allowed to continue without end.

FIGS. 6A to 6C illustrate examples of restoration learning in the dirty mode.

FIG. 6A illustrates the flow of restoration learning in the dirty mode.

Restoration learning in the dirty mode is conducted by allowing the restoration type identifier 106 to perform vehicle detection based on an image captured while the camera lens of the camera 100 is dirty. The restoration type identifier 106 includes the shape restoration section 105 and the second detection section 102. The shape restoration section 105 uses the identifier parameters 118 generated by the restoration learning section 104 in order to restore the vehicle shape from an image captured while the lens is dirty. The second detection section 102 performs vehicle detection based on the restored image.

When the second detection section 102 detects a vehicle based on a vehicle image restored by the shape restoration section 105, a pair of an actual dirt image cut out from an image of a vehicle at the same position as a detected vehicle in an original image and a vehicle image restored by the shape restoration section 105 is temporarily stored as a B image data group 114. When the B image data group 114 formed of a predetermined number of such pairs is stored, it is inputted to the restoration learning section 104. The restoration learning section 104 then performs the machine learning process to achieve restoration in such a manner that the resulting image state is close to the state of a vehicle image restored from the actual dirt image, that is, close to an image state where actual dirt is removed.

FIG. 6B illustrates an example of a vehicle image 600 that is captured while the camera lens is actually dirty and outputted from the second detection section 102. FIG. 6B shows an example in which mud 601 is attached to the camera lens. FIG. 6C illustrates an example of a vehicle image 602 that is obtained by allowing the shape restoration section 105 to perform image processing (image processing based on the identifier parameters 118 acquired by restoration learning) in such a manner as to remove dirt from the lens and achieve restoration to obtain a vehicle shape close to an original vehicle shape.

In the dirty mode, the vehicle image 600 captured while the lens is actually dirty is paired with the vehicle image 602 that is restored by the shape restoration section 105 until it becomes close to the original vehicle shape, and a plurality of such pairs are inputted to the restoration learning section 104 (FIG. 1).

FIGS. 7A to 7D relate to the results of identification by the restoration type identifier 106 and illustrate information stored in the identification score storage section 107 and exemplary operations of the identification score determination section 108.

Figure 7A:
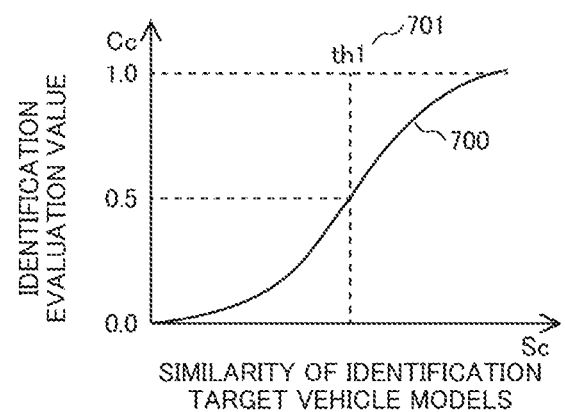

FIG. 7A shows a determination curve 700 that is based on the result of determination by the identification score determination section 108 and indicative of the relationship between similarity Sc of identification vehicle models and an identification evaluation value Cc. The identification evaluation value Cc shown in FIG. 7A is a calculated numerical value indicative of the degree of similarity between a certain vehicle model and a vehicle in an image restored from a vehicle shown in an input image by the restoration type identifier 106. The more similar to a certain identified vehicle model, the greater the numerical value Cc. The less similar to a certain identified vehicle model, the smaller the numerical value Cc.

The identification evaluation value Cc set in FIG. 7A is expressed within the range from 0 to 1. However, the identification evaluation value Cc may be changed as appropriate.

The similarity Sc of identification target vehicle models is represented by a calculated numerical value indicative of the degree of similarity between input image features and object features obtained by machine learning. The similarity Sc of identification target vehicle models that is represented by the greatest numerical value is selected. Here, the similarity Sc of identification target vehicle models may be regarded as a final identification evaluation value Cc.

It is known that a perception probability curve obtained when a human brain works to classify objects does not always remain linear but drastically changes in the vicinity of a threshold value. When, for instance, an attempt is made to identify the name of a certain viewable object, the probability of feeling obscurity is low and the probability of knowing the name or not knowing the name is relatively high. Such characteristics are represented, for example, by a sigmoid function. Machine learning conducted by using a neural network simulates the functionality of a human brain. It is therefore conceivable that such machine learning has a high affinity to the sigmoid function. Consequently, a function curve shown, for example, in FIG. 7A is set based on the linearity of a sigmoid function output curve. The resulting similarity Sc of identification target vehicle models is normalized and used in place of the aforementioned identification evaluation value Cc to finally determine the degree of similarity.

The function curve shown in FIG. 7A is merely an example. An alternative is to set further modified characteristics or set linear characteristics for the purpose of simplifying a function process.

Figure 7B:
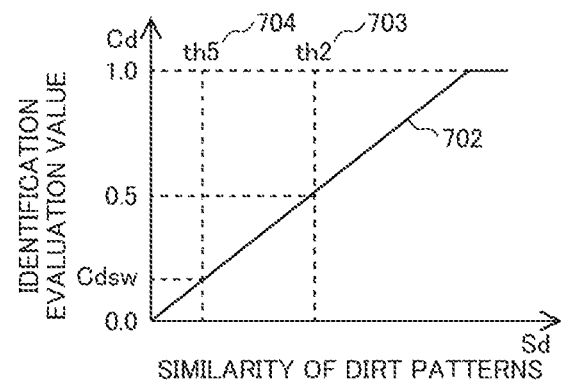

FIG. 7B shows a determination curve 702 that is based on the result of determination by the identification score determination section 108 and indicative of the relationship between similarity Sd of dirt patterns and an identification evaluation value Cd.

The identification evaluation value Cd shown in FIG. 7B is a calculated numerical value indicative of the degree of similarity between an input image dirt pattern and a dirt pattern in an image restored by the restoration type identifier 106. The higher the similarity between the input image dirt pattern and the dirt pattern of a dirt image used as a reference for learning, the greater the numerical value Cd. The lower the similarity, the smaller the numerical value Cd.

Here, the "dirt image used as a reference for learning" is an artificial dirt image shown in FIG. 3B or FIG. 6B or an actual dirt image that is captured during traveling of the vehicle while raindrops and mud are attached to the camera lens under rainy or other bad weather conditions.

The identification evaluation value Cd set in the example of FIG. 7B is expressed within the range from 0 to 1. However, the identification evaluation value Cd may be changed as appropriate.

The identification score storage section 107 stores a latest identification information table 704 (FIG. 7C) and an accumulated identification information table 705 (FIG. 7D). The latest identification information table 704 (FIG. 7C) records the most recent identification results outputted from the restoration type identifier 106. The accumulated identification information table 705 (FIG. 7D) cumulatively records the past identification results.

FIG. 7C illustrates an example of the latest identification information table 704. The latest identification information table 704 stores a detected vehicle model type, the identification evaluation value of a detected vehicle model, a dirt pattern type, the identification evaluation value of a dirt pattern, the threshold value of a detected vehicle model mc, the threshold value of a dirt pattern md, the threshold value of all vehicles, the threshold value of all dirt patterns, and the threshold value of vehicle detection mode switching.

FIG. 7D illustrates an example of the accumulated identification information table 705. The accumulated identification information table 705 stores the average identification evaluation value of all detected vehicle models, the average identification evaluation value of all dirt patterns, the average identification evaluation value of detected vehicle models n, and the average identification evaluation value of dirt patterns m.

Further, when the average identification evaluation value of all detected vehicle models is equal to or smaller than the threshold value of the detected vehicle model or when the average identification evaluation value of all dirt patterns is equal to or smaller than the threshold value of the dirt pattern, the identification score determination section 108 outputs a detection FAIL signal 117 to notify, for example, a user of a decrease in the vehicle detection reliability of the outside recognition device (FIG. 1).

Figure 8:
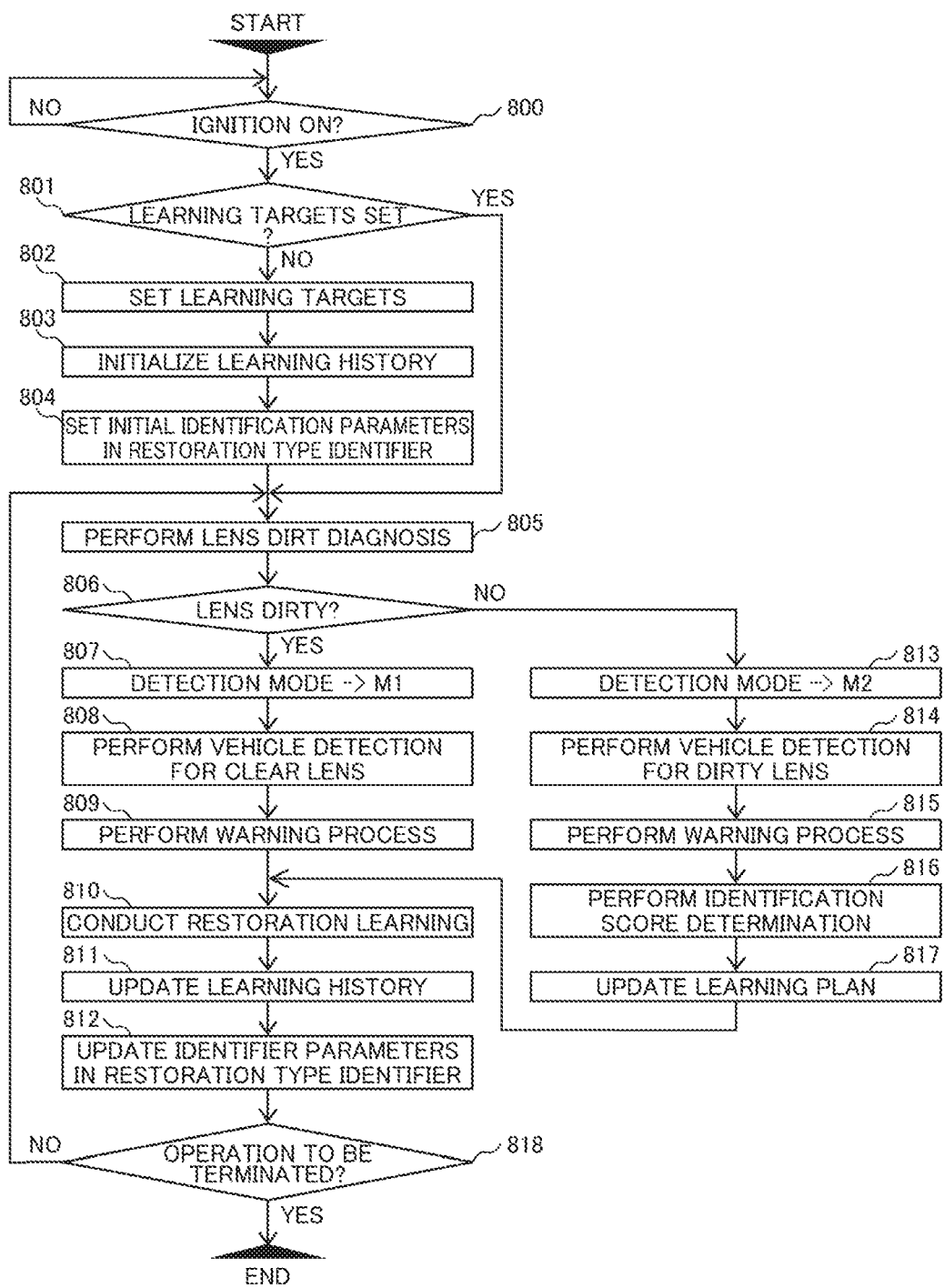
FIG. 8 is an overall flowchart illustrating a vehicle detection process.

FIG. 8 is an overall flowchart illustrating a vehicle detection process performed by the outside recognition device according to the present embodiment.

First of all, a check is performed to determine whether the ignition of the host vehicle is turned ON (step 800). If the ignition is not turned ON, a standby state continues until the ignition is turned ON.

If the ignition is turned ON, a check is performed to determine whether the learning target setting table 500 (FIG. 5B) stored in the learning plan section 109 is already set (step 801). If the learning target setting table 500 is already set, processing skips to lens dirt diagnosis (step 805). If the learning target setting table 500 is not set yet, predefined learning targets are set (step 802), the learning history table 501 (FIG. 5C) is initialized (step 803), and the identifier parameters for initial setup are set in the restoration type identifier 106 (step 804).

Next, the on-board camera 100 is subjected to lens dirt diagnosis (step 805) in order to determine whether the lens is dirty (step 806).

If the lens is not dirty ("YES" at step 806), the vehicle detection mode is set to the clear mode (M1) (step 807). In the clear mode, the first detection section 101 performs vehicle detection for a clear lens (step 808), and then performs a warning process based on the result of vehicle detection (step 809). Subsequently, the restoration learning section 104 conducts restoration learning by using an original vehicle image and an artificial dirt image that are acquired or generated in the clear mode (step 810), and then updates the learning history table 501 (step 811). Further, the identifier parameters acquired by restoration learning are outputted to the restoration type identifier for update purposes (step 812).

If, in step 806, the lens is found to be dirty ("NO" at step 806), the vehicle detection mode is set to the dirty mode (M2) (step 813). In the dirty mode, the second detection section 102 in the restoration type identifier 106 performs vehicle detection for a dirty lens (step 814), and then performs a warning process based on the result of vehicle detection (step 815). Next, the identification score determination section 108 performs identification score determination (step 816). Based on the result of determination, the learning plan section 109 updates the learning plan for restoration learning (step 817). Subsequently, the restoration learning section 104 conducts restoration learning (step 810), updates the learning history table 501 (step 811), and outputs the identifier parameters acquired by restoration learning to the restoration type identifier 106 for update purposes (step 812).

Finally, a check is performed to determine whether or not to terminate the vehicle detection process (step 818). If the vehicle detection process is to continue without being terminated ("NO" at step 818), processing returns to step 805 and repeats the vehicle detection process. If the vehicle detection process is to terminate, ("YES" at step 818), the vehicle detection process terminates.

Figure 9:
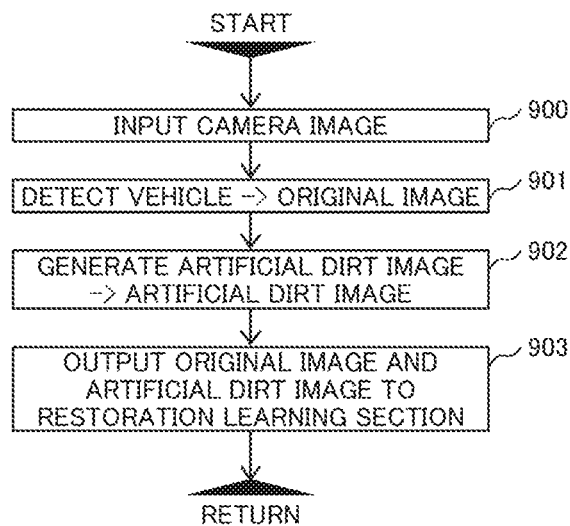
FIG. 9 is a flowchart illustrating an example of vehicle detection in the clear mode.

FIG. 9 is a flowchart of vehicle detection in the clear mode (M1).

In the clear mode (M1), a camera image is inputted (step 900). Then, an image acquired by vehicle detection by the first detection section 101 is regarded as an original image (step 901). Further, an image obtained by superimposing artificial dirt over the original image is regarded as an artificial dirt image (step 902). Subsequently, an image pair formed of the original image and the artificial dirt image is applied to learning by the restoration learning section 104 (step 903).

Figure 10:
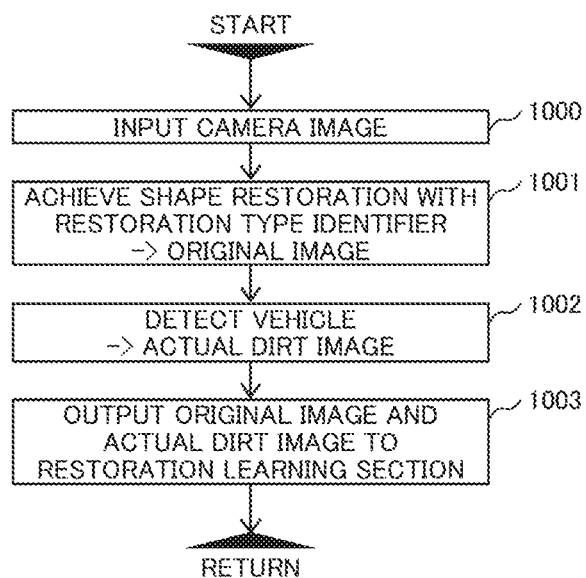
FIG. 10 is a flowchart illustrating an example of vehicle detection in the dirty mode.

FIG. 10 is a flowchart illustrating an example of vehicle detection that is performed in the dirty mode (M2) by the second detection section 102.

In the dirty mode (M2), a camera image is inputted (step 1000). Then, an image subjected to vehicle shape restoration by the restoration type identifier 106 is regarded as an original image (step 1001). Further, an image acquired by vehicle detection by the second detection section 102 is regarded as an actual dirt image (step 1002). Subsequently, an image pair formed of the original image and the actual dirt image is applied to learning by the restoration learning section 104 (step 1003).

Figure 11:
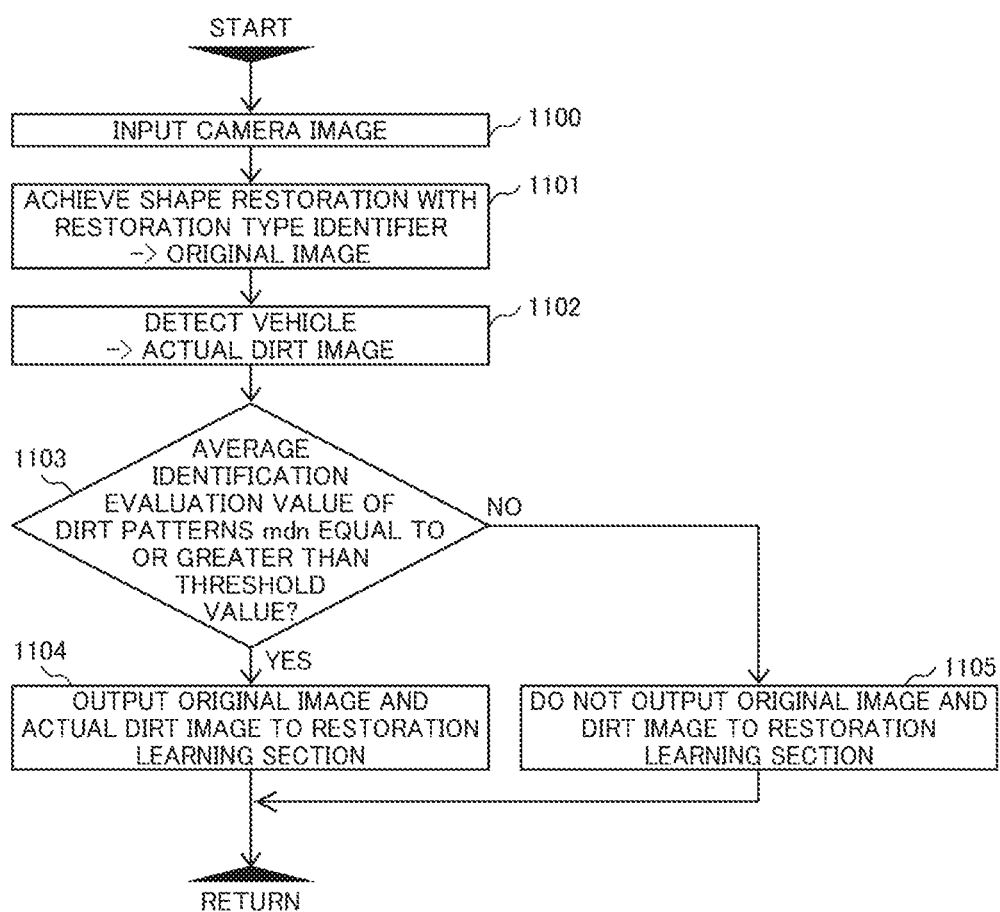
FIG. 11 is a flowchart illustrating another example of vehicle detection in the dirty mode.

FIG. 11 is a flowchart illustrating another example of vehicle detection that is performed in the dirty mode (M2) by the second detection section 102.

In another example of the dirty mode (M2), a camera image is inputted (step 1100). Then, an image subjected to vehicle shape restoration by the restoration type identifier 106 is regarded as an original image (step 1101). Further, an image acquired by vehicle detection by the second detection section 102 is regarded as an actual dirt image (step 1102). Subsequently, a check is performed to determine whether the average identification evaluation value of dirt patterns is equal to or greater than a dirt pattern threshold value in the latest identification information table 704 (step 1103). If the average identification evaluation value is equal to or greater than the threshold value, it is determined that reliability is high in a state where the lens is dirty, and an image pair formed of the original image and the actual dirt image is applied to learning by the restoration learning section 104 (step 1104). If the average identification evaluation value is smaller than the threshold value, it is determined that reliability is low in a state where the lens is dirty, and the image pair formed of the original image and the actual dirt image is not outputted to the restoration learning section 104 (step 1105).

Figure 12:
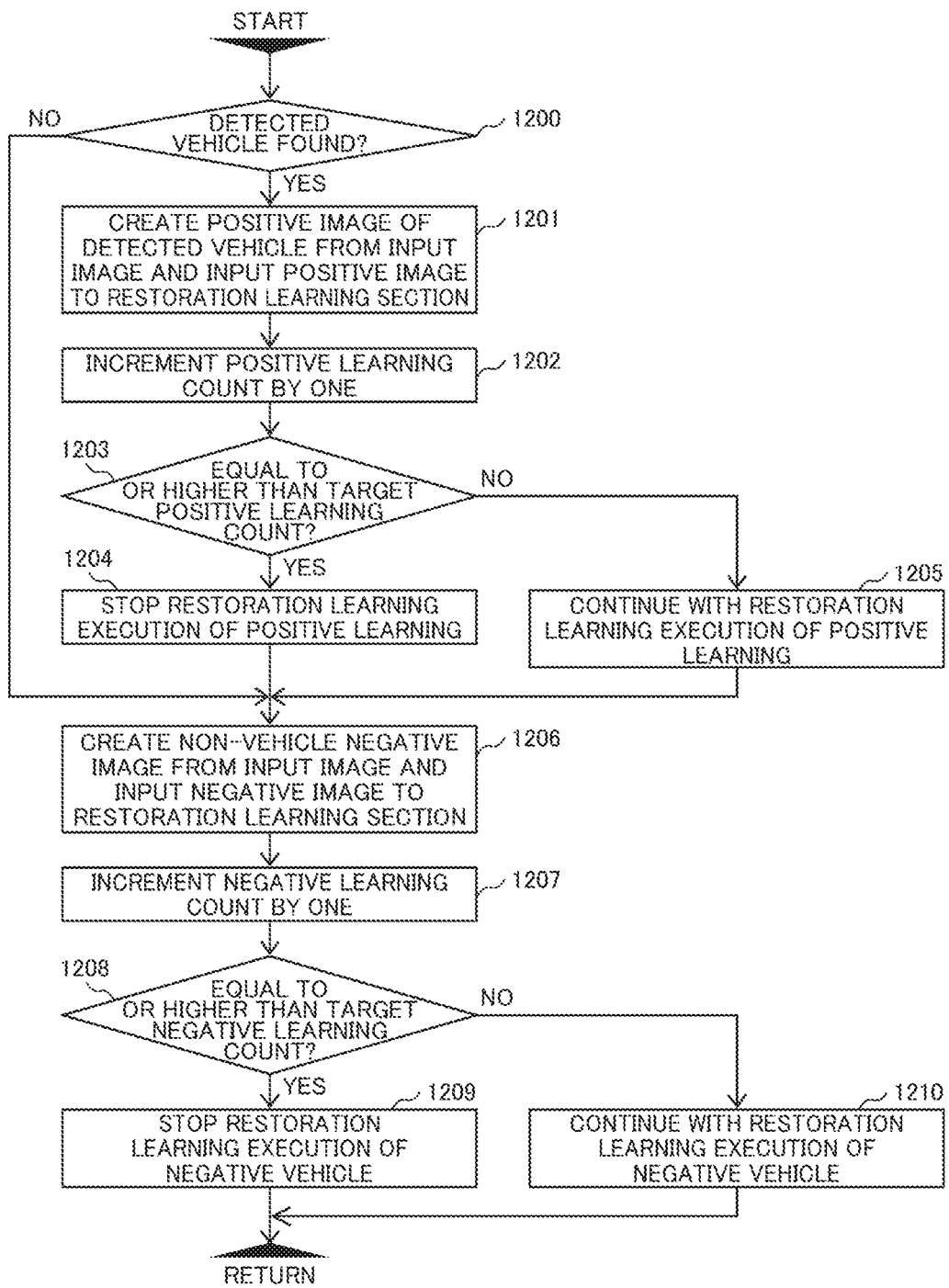
FIG. 12 is a flowchart illustrating execution control over a restoration learning section by the learning plan section.

FIG. 12 is a flowchart illustrating an example of execution control that is exercised over the restoration learning section 104 by the learning plan section 109. FIG. 12 shows an example in the clear mode (M1).

First of all, a check is performed to determine whether a vehicle detected by the first detection section 101 is in an image inputted from the camera 100 (step 1200). If there is no detected vehicle ("NO" at step 1200), processing skips to step 1206. If there is a detected vehicle ("YES" at step 1200), a positive learning image of the vehicle is generated from the input image and inputted to the restoration learning section 104 (step 1201), and then the positive learning count in the learning history table 501 is incremented by one (step 1202).

Next, a check is performed to determine whether the positive learning count in the learning history table 501 is equal to or higher than the positive learning count in the learning target setting table 500 (step 1203). If the positive learning count is equal to or higher than the target learning count ("YES" at step 1203), the input of the positive learning image to the restoration learning section 104 is stopped, and restoration learning with the positive learning image is stopped (step 1204). If the positive learning count is lower than the target learning count ("NO" at step 1203), restoration learning with the positive learning image is continued (step 1205).

Subsequently, a negative learning image of the vehicle is generated from the input image and inputted to the restoration learning section 104 (step 1206), and the negative learning count in the learning history table 501 is incremented by one (step 1207). Next, a check is performed to determine whether the negative learning count in the learning history table 501 is equal to or higher than the negative learning count in the learning target setting table 500 (step 1208). If the negative learning count is equal to or higher than the target learning count ("YES" at step 1208), the input of the negative learning image to the restoration learning section 104 is stopped, and restoration learning with the negative learning image is stopped (step 1209). If the negative learning count is lower than the target learning count ("NO" at step 1208), restoration learning with the negative learning image is continued (step 1210).

The above-described control sequence is performed in the dirty mode as well. However, in the control sequence performed in the dirty mode, the positive and negative learning images are replaced by an image (B image data) outputted from the restoration type identifier 106.

Figure 13:
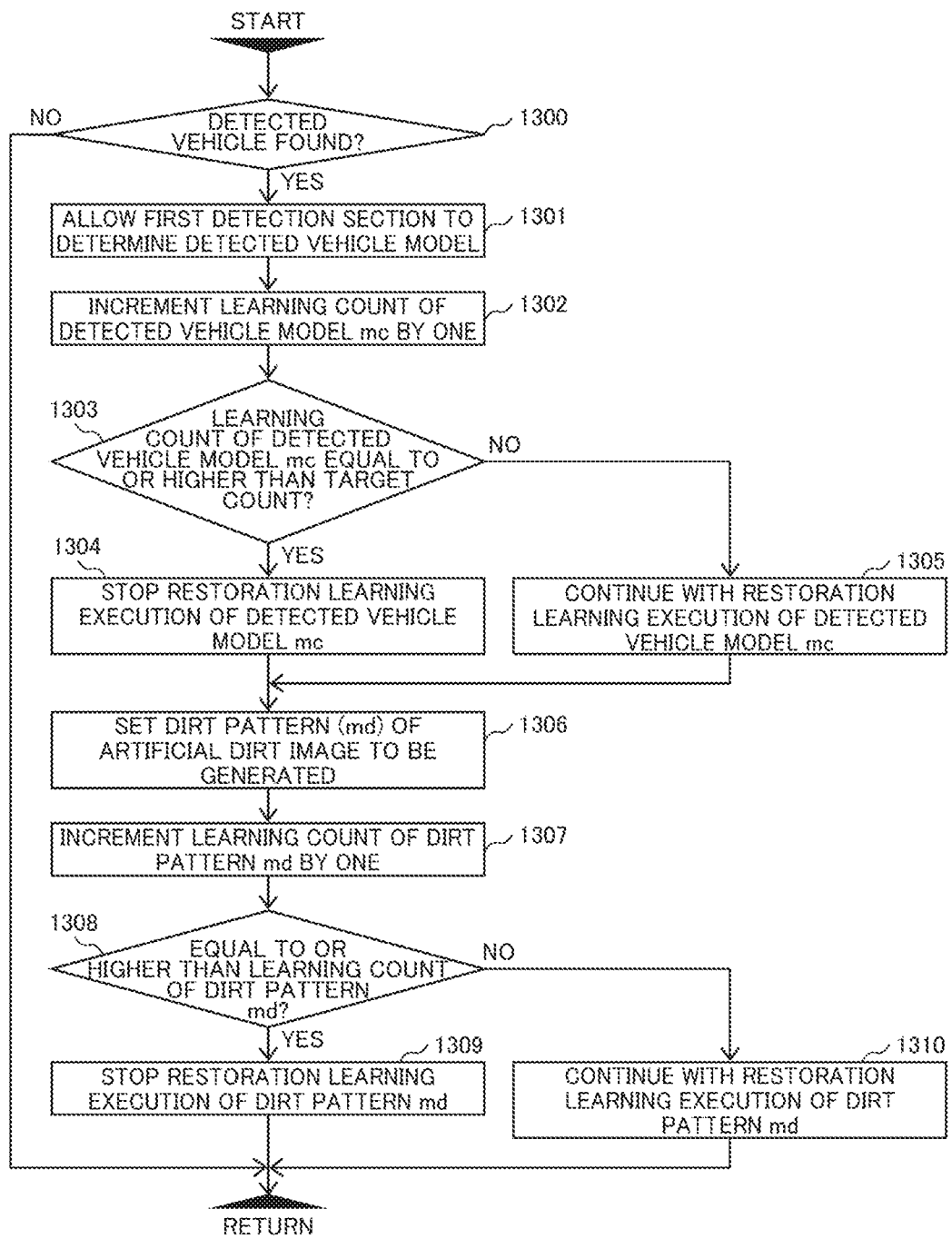
FIG. 13 is a flowchart illustrating another example of execution control over the restoration learning section by the learning plan section.

FIG. 13 is a flowchart illustrating another example of execution control that is exercised over the restoration learning section 104 by the learning plan section 109. FIG. 13 shows an example in the clear mode (M1).

First of all, a check is performed to determine whether a vehicle detected by the first detection section 101 is in an image inputted from the camera 100 (step 1300). If there is no detected vehicle ("NO" at step 1300), this control sequence terminates. If there is a detected vehicle ("YES" at step 1300), the first detection section 101 determines the vehicle model of the detected vehicle (step 1301). Here, it is assumed that a detected vehicle model is mc.

Next, the learning count of the detected vehicle model mc in the learning history table 501 is incremented by one (step 1302). Next, a check is performed to determine whether the learning count of the detected vehicle model mc in the learning history table 501 is equal to or higher than the learning count mcn of the detected vehicle model mc in the learning target setting table 500 (step 1303). If the learning count of the detected vehicle model mc is equal to or higher than the target learning count (mcn) ("YES" at step 1303), the input of the learning image of the detected vehicle model mc to the restoration learning section 104 is stopped, and restoration learning with the learning image of the detected vehicle model mc is stopped (step 1304). If the learning count of the detected vehicle model mc is lower than the target learning count (mcn) ("NO" at step 1303), restoration learning with the learning image of the detected vehicle model mc is continued (step 1305).

Subsequently, based on the dirt pattern and of an artificial dirt image that is set at the time of input to restoration learning, the learning count of the dirt pattern md in the learning history table 501 is incremented by one (steps 1306 and 1307). Next, a check is performed to determine whether the learning count of the dirt pattern md in the learning history table 501 is equal to or higher than the learning count mdn of the dirt pattern md in the learning target setting table 500 (step 1308). If the learning count of the dirt pattern md is equal to or higher than the target learning count (mdn) ("YES" at step 1308), the input of the learning image of the dirt pattern md to the restoration learning section 104 is stopped, and restoration learning with the learning image of the dirt pattern md is stopped (step 1309). If the learning count of the dirt pattern md is lower than the target learning count (mdn) ("NO" at step 1308), restoration learning with the learning image of the dirt pattern md is continued (step 1310).

The above-described control sequence is performed in the dirty mode as well. However, in the control sequence performed in the dirty mode, the detected vehicle model and the dirt pattern are replaced by the vehicle model and dirt pattern detected by the restoration type identifier 106.

Figure 14:
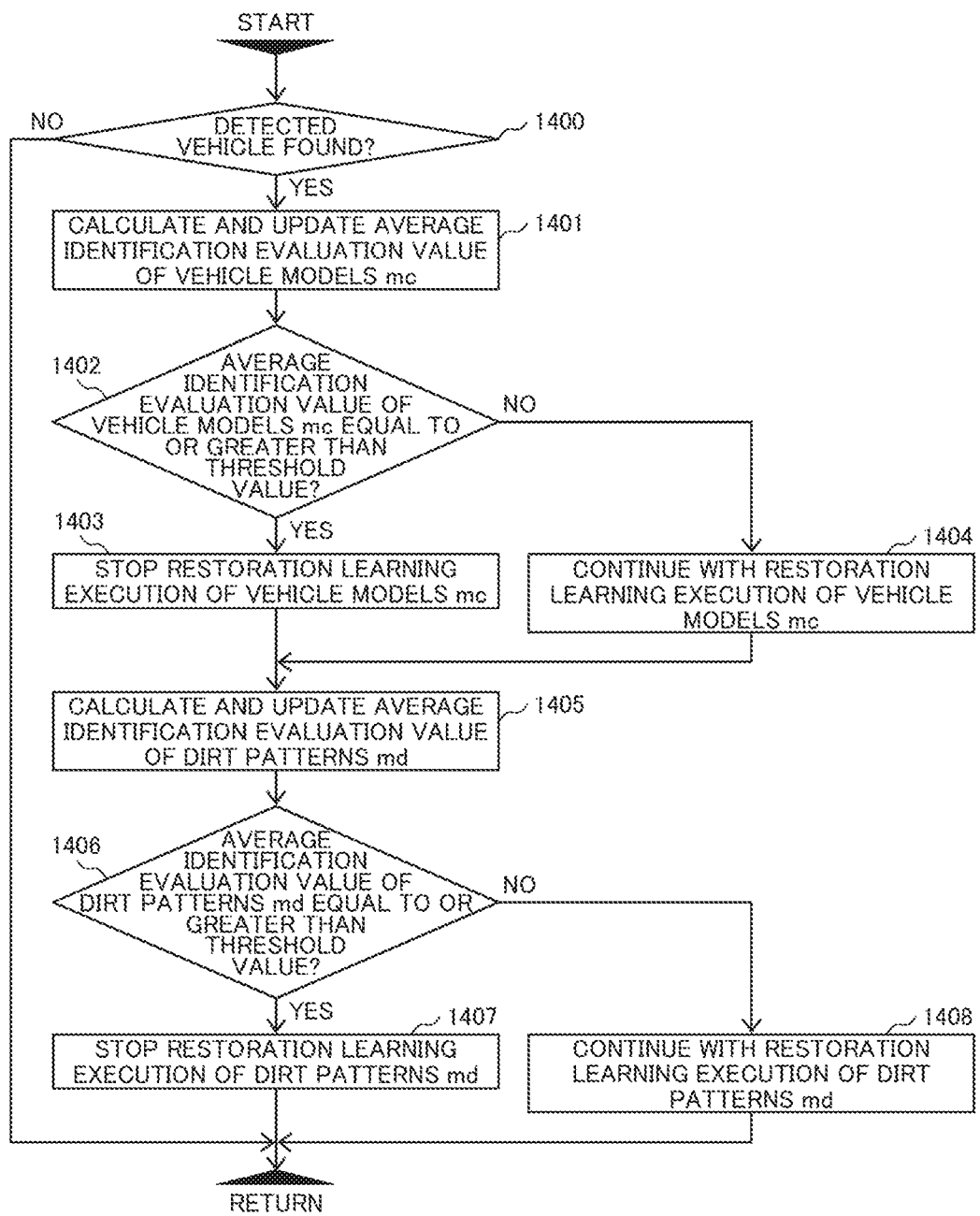
FIG. 14 is a flowchart illustrating still another example of execution control over the restoration learning section by the learning plan section.

FIG. 14 is a flowchart illustrating still another example of execution control that is exercised over the restoration learning section 104 by the learning plan section 109. FIG. 14 shows an example in the dirty mode (M2).

Referring to FIG. 14, the execution of the restoration learning section 104 is controlled based on the average identification evaluation value of vehicle models detected by the restoration type identifier 106 and the average identification evaluation value of detected dirt patterns.

First of all, a check is performed to determine whether a vehicle detected by the second detection section 102 is in an image inputted from the camera 100 (step 1400). If there is no detected vehicle ("NO" at step 1400), this control sequence terminates.

If there is a detected vehicle ("YES" at step 1400), the detected vehicle is tentatively regarded as mc. Based on the identification evaluation value of the detected vehicle model mc that is calculated by the restoration type identifier 106, the average identification evaluation value of detected vehicle models mc in the accumulated identification information table 705 is updated (step 1401).

Next, a check is performed to determine whether the average identification evaluation value of the detected vehicle models mc in the accumulated identification information table 705 is equal to or greater than the threshold value th1 of the detected vehicle models mc in the latest identification information table 704 (step 1402). If the average identification evaluation value of the detected vehicle models mc is equal to or greater than the threshold value th1 ("YES" at step 1402), the input of the learning image of the detected vehicle models mc to the restoration learning section 104 is stopped, and restoration learning with the learning image of the detected vehicle models mc is stopped (step 1403). If the average identification evaluation value of the detected vehicle models mc is smaller than the threshold value th1 ("NO" at step 1402), restoration learning with the learning image of the detected vehicle models mc is continued (step 1404).

Subsequently, based on the identification evaluation value of the dirt pattern md that is calculated by the restoration type identifier 106, the average identification evaluation value of the dirt patterns md in the accumulated identification information table 705 is updated (step 1405).

A check is performed to determine whether the average identification evaluation value of the dirt patterns md in the accumulated identification information table 705 is equal to or greater than the threshold value th2 of the dirt patterns md in the latest identification information table 704 (step 1406). If the average identification evaluation value of the dirt patterns md is equal to or greater than the threshold value th2 ("YES" at step 1406), the input of the learning image of the dirt patterns md to the restoration learning section 104 is stopped, and restoration learning with the learning image of the dirt patterns md is stopped (step 1407). If the average identification evaluation value of the dirt patterns md is smaller than the threshold value th2 ("NO" at step 1406), restoration learning with the learning image of the dirt patterns md is continued (step 1408).

Figure 15:
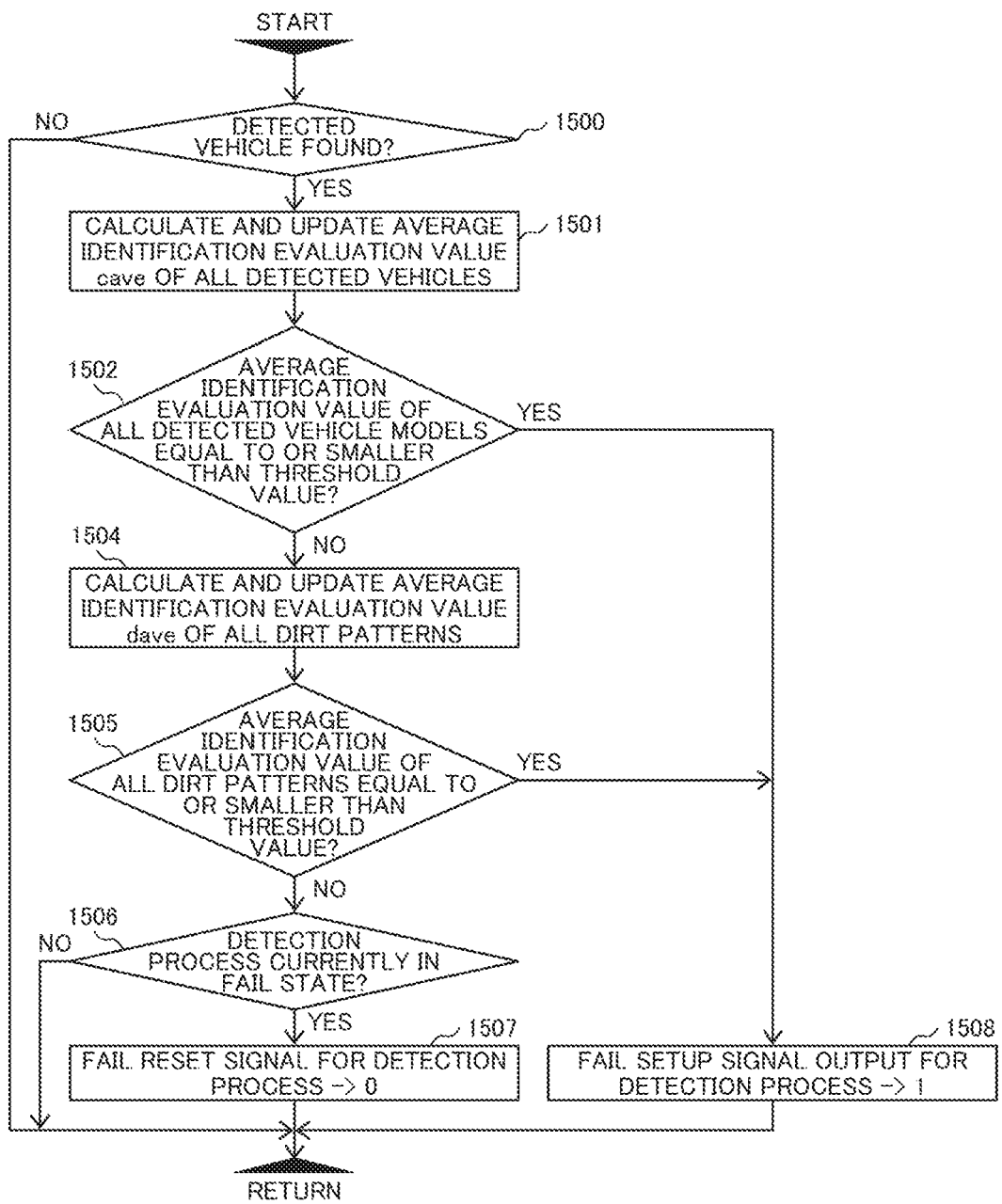
FIG. 15 is a flowchart illustrating detection FAIL signal output control in the vehicle detection process.

FIG. 15 is a flowchart illustrating detection FAIL signal output control that is exercised by the identification score determination section 108 during the vehicle detection process. FIG. 15 shows an example in the dirty mode (M2). It is assumed that the detection FAIL signal 117 is initialized to the state of a reset signal (0) when the outside recognition device starts up.

First of all, a check is performed to determine whether a vehicle detected by the second detection signal 102 is in an image inputted from the camera 100 (step 1500). If there is no detected vehicle ("NO" at step 1500), this control sequence terminates. If there is a detected vehicle ("YES" at step 1500), the average identification evaluation value cave of all detected vehicles is calculated based on the result of vehicle detection by the restoration type identifier 106, and the average identification evaluation value cave of all detected vehicle models in the accumulated identification information table 702 is updated (step 1501).

Next, a check is performed to determine whether the average identification evaluation value of all detected vehicle models is equal to or smaller than the threshold value th3 of all detected vehicles in the latest identification information table 704 (step 1502). If the average identification evaluation value of all detected vehicle models is equal to or smaller than the threshold value th3 ("YES" at step 1502), it is determined that the vehicle detection reliability of the restoration type identifier 106 is lowered, and a detection FAIL setup signal (1) for stopping the vehicle detection process of the outside recognition device is outputted (step 1508). If the average identification evaluation value of all detected vehicle models is greater than the threshold value th3 ("NO" at step 1503), the average identification evaluation value of all dirt patterns is calculated based on the result of vehicle detection by the restoration type identifier 106, and the average identification evaluation value dave of all dirt patterns in the accumulated identification information table 705 is updated (step 1504).

Next, a check is performed to determine whether the average identification evaluation value of all dirt patterns is equal to or smaller than the threshold value th4 of all dirt patterns in the latest identification information table 704 (step 1505). If the average identification evaluation value of all dirt patterns is equal to or smaller than the threshold value th4 ("YES" at step 1505), it is determined that the dirt pattern determination reliability of the restoration type identifier 106 is lowered, and the detection FAIL setup signal (1) for stopping the vehicle detection process of the outside recognition device is outputted (step 1508) to terminate this control sequence.

If the average identification evaluation value of all dirt patterns is greater than the threshold value th4 ("NO" at step 1505), a check is performed to determine whether the vehicle detection process of the outside recognition device is in a FAIL state (step 1506). If the vehicle detection process in the FAIL state ("YES" at step 1506), a detection FAIL reset signal (0) is outputted (step 1507) to terminate this control sequence. If the vehicle detection process is not in the FAIL state ("NO" at step 1506), a non-FAIL state is retained to terminate this control sequence.

FIG. 16 is a flowchart illustrating an alternative example of control over a vehicle detection mode switching process (steps 805 to 807 and 813 of FIG. 8).

Referring to the overall flowchart of FIG. 8, which depicts the vehicle detection process, the vehicle detection mode switching process in steps 805 and 806 may be performed based on the average identification evaluation value of all dirt patterns, which is calculated from the result of vehicle detection by the restoration type identifier 106.

For example, a check is performed to determine whether the average identification evaluation value of all dirt patterns is equal to or smaller than the threshold value of vehicle detection mode switching (is zero or a very small value) (step 1600). If the average identification evaluation value of all dirt patterns is equal to or smaller than the threshold value ("YES" at step 1600), it is determined that the lens is probably unlikely to be dirty, the vehicle detection mode is set to the clear mode (M1) (step 1601), and processing proceeds to step 808 of FIG. 8. If the average identification evaluation value is greater than the threshold value ("NO" at step 1600), the lens is determined to be probably likely to be dirty, the vehicle detection mode is set to the dirty mode (M2) (step 1602), and processing proceeds to step 814 of FIG. 8.

Figure 17:
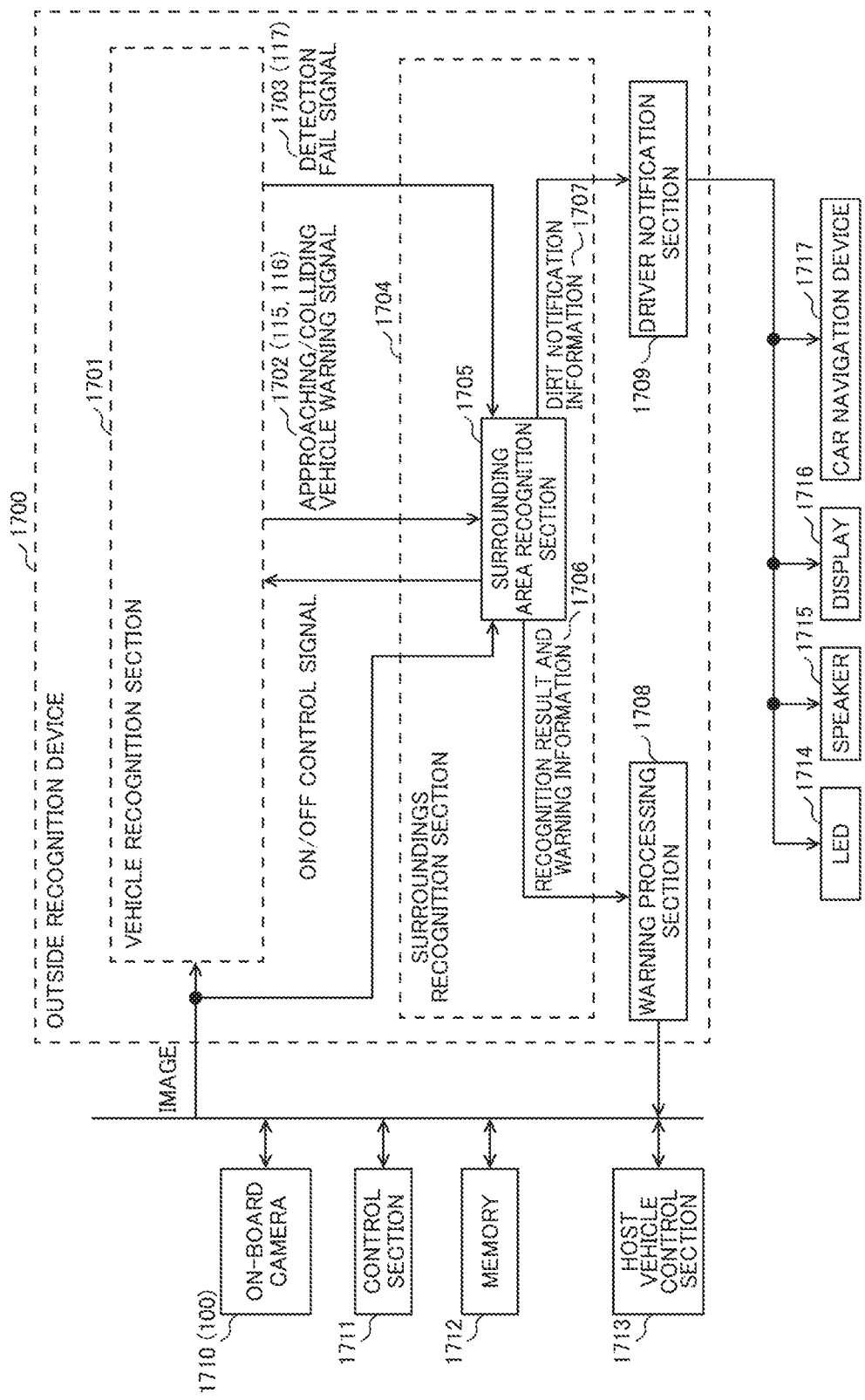
FIG. 17 is a diagram illustrating an exemplary configuration of an outside recognition device according to the embodiment.

FIG. 17 is a diagram illustrating a configuration of the outside recognition device 1700 according to the present example.

The outside recognition device 1700 includes a vehicle recognition section 1701 (the entirety of FIG. 1 except the camera 100), a surroundings recognition section 1704, a warning processing section 1708, and a driver notification section 1709.

The outside recognition device 1700 is connected through a signal bus to an on-board camera 1710 (100), a memory 1712, and a control section 1711. The on-board camera 1710 captures an image of the surroundings of the host vehicle. The memory 1712 temporarily stores a plurality of images captured by the on-board camera 1710 (corresponding to the camera 100 shown in FIG. 1). The control section 1711 controls the input and output of captured images between the on-board camera 1710 and the outside recognition device 1700, and controls the input and output of recognition result information and warning signals between the outside recognition device 1700 and a host vehicle control section 1713.

The vehicle recognition section 1701 outputs a warning signal 1702 (115 and 116 in FIG. 1) and a detection FAIL signal to the surroundings recognition section 1704. The warning signal 1702 is based on the result of vehicle detection and indicative of a dangerous situation created by an approaching or colliding vehicle. The detection FAIL signal is based on the result of lens dirt detection by the on-board camera 1710.

The surroundings recognition section 1704 is formed of a surrounding area recognition section 1705 that recognizes the surroundings of the host vehicle including vehicles around the host vehicle.

The warning processing section 1708 transmits to the host vehicle control section 1713 the recognition result information and warning signal 1706 outputted from the surrounding area recognition section 1705.

When the detection FAIL signal 1703 (117 in FIG. 1) is outputted from the vehicle recognition section 1701 and the lens surface of the on-board camera is determined to be dirty, for example, with mud, rain, cloud, or ice, erroneous recognition is likely to occur because it is difficult for the surrounding area recognition section 1705 to perform an accurate image recognition process. In this instance, therefore, the vehicle recognition section 1701 and the surrounding area recognition section 1705 stop their operations temporarily or continuously.

In the above case, the surrounding area recognition section 1705 outputs dirt notification information 1707 to the driver notification section 1709. The dirt notification information 1707 indicates that the operation of the surrounding area recognition section 1705 is stopped temporarily or continuously. Upon receiving the dirt notification information 1707, the driver notification section 1709 issues a relevant notification to the driver by transmitting illumination or display instruction information, for example, to an LED 1714, a speaker 1715, a display 1716, and a car navigation device 1717, which are installed external to the outside recognition device 1700.

In a recognition process performed by the surrounding area recognition section 1705, a camera image showing the vicinity of the host vehicle and far surrounding space is analyzed to detect and recognize the presence of the other vehicles, including motorcycles and bicycles, the presence of pedestrians, and the presence of obstacles that obstruct the traveling or parking of the host vehicle. The recognition process also includes detecting the rapid approaching of the other vehicles, including motorcycles and bicycles, in the vicinity of and in an area far from the host vehicle and predicting a collision between the host vehicle and the other vehicles, and includes predicting a collision between the host vehicle and the obstacles. The recognition process further includes a lane departure warning process and a blind spot warning process. The lane departure warning process issues a warning when the host vehicle departs from its traveling lane. The blind spot warning process issues a warning when persons or the other vehicles are in a blind spot of the driver of the host vehicle.

REFERENCE SIGNS LIST

100: Camera
101: First detection section
102: Second detection section
103: Artificial dirt formation section
104: Restoration learning section
105: Shape restoration section
106: Restoration type identifier
107: Identification score storage section
108: Identification score determination section
109: Learning plan section
110: Lens dirt diagnosis section
111: Detection mode switching section

The invention claimed is:

1. An object detection method for detecting an object in a captured image, the method comprising:
   switching, based on the captured image, between a clear mode when a lens used for image capturing is not dirty, and a dirty mode when the lens is dirty, the clear mode and the dirty mode being selectable for detecting a detection target object;
   while in the clear mode:
      preparing an original image including the detection target object from the captured image;
      generating a processed image by performing a predetermined process on the prepared original image;
      conducting restoration learning about an image of the detection target object by using the original image and the processed image, and generating identifier parameters required for a restoration process;
   while in the dirty mode:
      conducting the restoration process to restore an image of the detection target object by using the generated identifier parameters from the captured image; and
      based on the restored image, detecting the detection target object.

2. The object detection method according to claim 1, comprising:
   preparing a learning plan, including learning targets and a learning history, for the restoration learning; and
   conducting the restoration learning in accordance with the prepared learning plan.

3. The object detection method according to claim 2, wherein the learning plan includes at least a learning count of each type of detection target object and a learning count of a captured image including the detection target object.

4. The object detection method according to claim 3, comprising conducting the restoration learning until either learning count included in the learning plan is exceeded.

5. The object detection method according to claim 1, further comprising:
   storing an evaluation value that is calculated when the restoration process is performed; and
   when the evaluation value is equal to or smaller than a predetermined threshold value, refraining from continuing with the restoration process.

6. The object detection method according to claim 1, wherein the predetermined process is a process of superimposing an artificial dirt image, and wherein the detection target object is a vehicle.

7. The object detection method according to claim 1,
   wherein the predetermined process is a process of superimposing an artificial dirt image, and
   wherein the detection target object is a vehicle.

8. An object detection system for detecting an object included in a captured image, the system comprising:
   a detection mode switching section configured to switch, based on the captured image, between a clear mode when a lens used for image capturing is not dirty, and a dirty mode when the lens is dirty, the clear mode and the dirty mode being selectable for detecting a detection target object;
   a first detection section configured to detect the detection target object included in a captured image and to prepare an original image of the detected object in the clear mode;
   a generation section configured to generate a processed image by performing a predetermined process on the original image by using the original image prepared by the first detection section in the clear mode;
   a restoration learning section configured to conduct restoration learning about an image of the detection target object by using the original image and the processed image, and configured to generate identifier parameters required for a restoration process in the clear mode;
   a shape restoration section configured to restore an image of the detection target object by using the identifier parameters that are generated by the restoration learning section from an image captured in the dirty mode; and
   a second detection section that, based on the restored image, is configured to detect the detection target object in the dirty mode.

9. The object detection system according to claim 8, further comprising a learning plan section configured to prepare a learning plan including targets and a learning history for restoration learning by the restoration learning section, wherein the restoration learning section is configured to conduct restoration learning in accordance with the prepared learning plan.

10. The object detection system according to claim 9, wherein the learning plan includes at least a learning count of each type of detection target object and a learning count of a captured image including the detection target object.

11. The object detection system according to claim 10, wherein the restoration learning section is configured to conduct restoration learning until either learning count included in the learning plan is exceeded.

12. The object detection system according to claim 8, further comprising a second detection section that, when the second detection mode is selected based on the captured image, generates a restored image by performing a restoration process on a portion of the captured image that includes an object, wherein the restoration learning section conducts restoration learning about an image of the object by using the captured image and the restored image.

13. The object detection system according to claim 8, wherein the predetermined process is a process of superimposing an artificial dirt image, and wherein the detection target object is a vehicle.

* * * * *